United States Patent [19]
Fricker

[11] 3,804,291
[45] Apr. 16, 1974

[54] FUEL TANK FOR VEHICLES
[75] Inventor: Ludwig Fricker, Stuttgart, Germany
[73] Assignee: Daimler-Benz Aktiengesellschaft, Stuttgart-Unterturkheim, Germany
[22] Filed: Sept. 8, 1972
[21] Appl. No.: 287,454

[30] Foreign Application Priority Data
Sept. 10, 1971 Germany.............................. 2145242

[52] U.S. Cl............... 220/85 R, 220/20, 220/86 R, 280/5 A
[51] Int. Cl........................ B65d 25/00, B65d 1/24
[58] Field of Search..... 220/85 R, 85 F, 85 S, 86 R, 220/44 A, 86 NR, 86 AT; 280/5 A; 137/587, 43

[56] References Cited
UNITED STATES PATENTS

| | | | |
|---|---|---|---|
| 3,064,668 | 11/1962 | Alkire et al............................ | 137/43 |
| 2,429,280 | 10/1947 | Scully et al. ......................... | 137/587 |
| 2,528,600 | 11/1950 | Lombard .............................. | 137/43 |
| 2,172,836 | 9/1939 | Elsom ................................... | 220/20 |
| 2,339,303 | 10/1944 | Tillery.................................... | 220/20 |

FOREIGN PATENTS OR APPLICATIONS

| | | | |
|---|---|---|---|
| 1,354,284 | 1/1963 | France.............................. | 220/44 A |
| 1,335,815 | 10/1962 | France............................... | 137/587 |
| 836,075 | 6/1960 | Great Britain..................... | 220/86 R |

Primary Examiner—William I. Price
Assistant Examiner—Allan N. Shoap
Attorney, Agent, or Firm—Craig & Antonelli

[57] ABSTRACT

A fuel tank for vehicles, especially for passenger motor vehicles, in which a container is provided on the inside of the tank within the highest area thereof and located at least partially above the maximum filling height; the container is closed except for at least one opening of small cross section located at its bottom side and is provided with a connection extending additionally to the tank by way of a dome mounted on the tank; the portion of the connection leading from the dome to the container is constituted by a channel with a channel opening on the side of the dome disposed near the apex of the dome; a vent and pressure-release line for the tank system which projects out of the dome in the upward direction protrudes into the channel under formation of an annular gap of relatively small cross section which permits the ready passage therethrough of gas but which permits the passage therethrough of fuel only in small droplets.

35 Claims, 6 Drawing Figures

PATENTED APR 16 1974          3,804,291
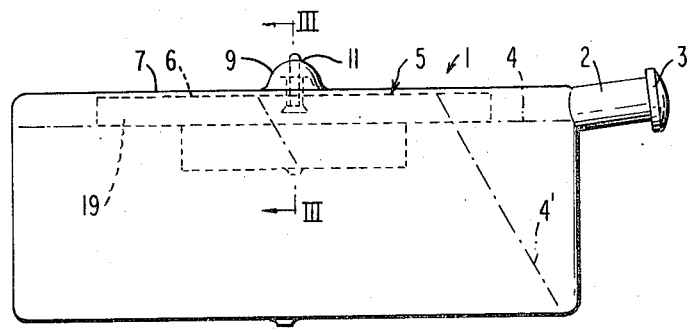
FIG.1
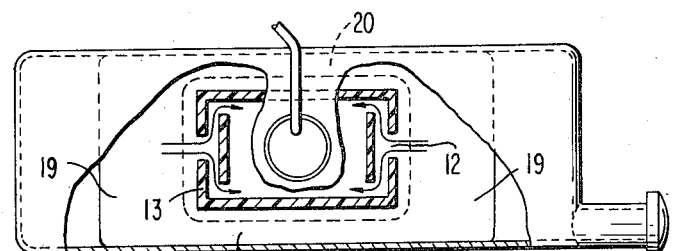
FIG.2
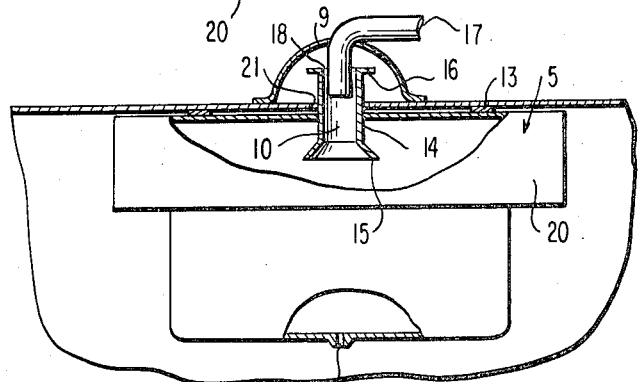
FIG.3
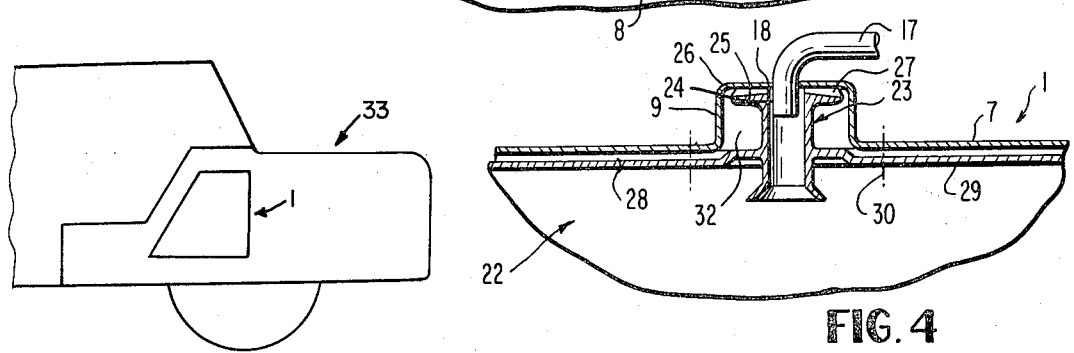
FIG.4
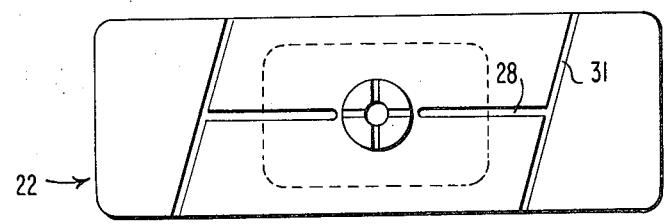
FIG.6
FIG.5

FUEL TANK FOR VEHICLES

The present invention relates to a fuel tank for vehicles, especially for passenger motor vehicles, and is concerned with the task to provide a fuel tank which excels by a particularly space-saving and closed construction and which nevertheless has a sufficiently large equalization volume for the liquid expansion as well as is provided with venting and pressure release devices that are safe against overflow.

This is achieved according to the present invention in that a container is provided on the inside of the fuel tank within the highest area thereof and located at least partially above the maximum filling height thereof, which container is closed except for an opening of small cross section located at its bottom side and which is provided additionally with a connection to the tank extending by way of a dome mounted on top of the tank, whose connecting portion leading from the dome to the container is constituted by a channel with a channel aperture on the dome side disposed near the apex of the dome, into which protrudes under formation of an annular gap of small cross section a vent and pressure-release line for the tank system extending upwardly out of the dome.

It is achieved by the arrangement of the container which is provided exclusively at its bottom side with an opening of small cross section, on the inside of the tank that when tanking to maximum filling height, an air volume remains since the level within the tank rises considerably more rapidly during the tanking than on the inside of the container, into which the fuel can enter only through the relatively small bottom opening. The thus-obtained air volume is available for volume expansions of the fuel when warming up. If this air volume is displaced by a volume expansion of the fuel, then it reaches the dome by way of the connection existing between tank and container, enters thereat through the annular gap into the channel provided between dome and container and can overflow from the same into the vent line by reversal of its direction of flow. This vent path remains fuel-free also during strong level fluctuations in the tank and during drives through curves since any fuel reaching the dome can enter through the annular gap only in small quantity and thereby fill the container which is so designed and dimensioned that with a filling height of the container corresponding to the maximum filling height of the tank, the fuel level in the container does not reach the vent line also when driving through curves.

In order to prevent also during strong level movements on the inside of the container a penetration of the fuel into the connecting channel or into the vent line projecting into the same, it is appropriate if the connecting channel has a section projecting into the container which is enlarged funnel-shaped at its end disposed on the inside of the container above the maximum filling height of the tank. This can be achieved in a particularly simple manner if the connecting channel is constituted by a pipe inserted into the container. The funnel-shaped enlargement for the prevention of the penetration of fuel has proved advantageous as it has been discovered that the fuel present in the container rises as a rule along the container walls during strong level fluctuations and collapses toward the center where the connecting channel is provided, so that a shield is formed by the funnel-shaped enlargement which prevents a filling of the funnel cross section with fuel splashing about.

According to a further feature of the present invention, it has proved as appropriate to coordinate a collar to the connecting channel within the area of the channel opening on the side of the dome so that the splashing-in of fuel which has reached the dome, into the annular gap is made more difficult. This collar can be provided or mounted at the pipe end disposed in the dome when the connecting channel is constituted by a pipe.

If the container is made of synthetic plastic material such as synthetic resinous material of any suitable type which represents a preferred solution, then the connecting channel can be formed by a bore in a mushroom-shaped container top which is constructed appropriately in one piece with the container.

Especially with such a construction, the annular gap can be protected particularly appropriately against inflow of fuel in that the head of the mushroom-shaped container top abuts at the inner surface of the dome and that groove-shaped channels leading to the bore are provided in the top surface which appropriately include a drop or inclination toward the outer circumference of the head portion.

The connection in the transition from the dome to the tank is formed within the scope of the present invention appropriately by channels which extend between the upper tank wall and the top wall of the container adjacent thereto. Separate lines can be economized thereby and in particular also a tank system can be formed thereby which in addition to the tank filler pipe connection and vent line has no lines extending toward the outside.

In order to render more difficult the penetration of fuel into the dome, the channels extending between dome and tank can be arranged according to the present invention not only labyrinth-like but the transition from the container to the tank can be additionally rendered more difficult by an annular gap which is delimited by the outer wall of the connecting channel connected with the container and terminating in the dome and by the upper tank wall traversed by this connecting channel.

A simple arrangement of the channels extending between the dome and the tank is attainable in that these channels are provided in an intermediate layer which is arranged between the upper wall of the container and the upper tank wall. However, it is also possible within the scope of the present invention to provide the channels extending between the dome and the tank in the upper wall of the container, in the upper tank wall or in the upper wall of the container and in the upper tank wall whereby the channels can be constituted by beads or corrugations embossed into these walls. It may be appropriate in particular for such an arrangement if the container abuts at the upper wall of the tank by way of its top wall. The arrangement of the channels in the top wall of the container is to be recommended in particular when the container is made of synthetic plastic material.

A channel arrangement particularly appropriate within the scope of the present invention consists in that on both sides of the dome, one channel each extending toward a tank lateral zone is provided which terminates in a channel extending transversely thereto.

In order to avoid as much as possible a penetration of fuel into the dome, it is appropriate to arrange the dome approximately centrally above the tank and container, in relation to a plan view, approximately centrally in the tank. This over-all arrangement results in the arrangement of the connecting channel approximately centrally to the container which has also been recognized as appropriate according to the press invention.

In order to prevent also during extreme curve drives an entry of fuel present in the container into the vent line, it is appropriate if the container arranged on the inside of the tank is provided within its area disposed above the maximum filling height of the tank with additional volumes constituted by bulged-out or widened portions. Such additional volumes can be achieved in a particularly favorable manner with a tank which is arranged transversely in relation to the vehicle longitudinal direction and in which is arranged a container matched in its width to the width of the tank measured in the vehicle longitudinal direction, in that the container includes in its upper area container sections extending toward the lateral zones of the tank whose height corresponds approximately to the tank height above the maximum filling level and whose bottom side lies at the height of the maximum tank filling level.

Accordingly, it is an object of the present invention to provide a fuel tank for vehicles which avoids by simple means the aforementioned drawbacks and shortcomings encountered with the prior art constructions.

Another object of the present invention resides in a fuel tank for vehicles which excels by a particularly space-saving construction.

A further object of the present invention resides in a fuel tank for motor vehicles of the aforementioned type which assures a sufficiently large equalization volume for the fluid expansion and assures against overflow of fuel into the vent and pressure-release devices.

A further object of the present invention resides in a fuel tank in which a sufficient volume remains even when tanking to maximum filling height, to accommodate any fuel expansions during warm-up thereof.

Another object of the present invention resides in a fuel tank in which a penetration of fuel into the connecting channel or vent line is effectively precluded even during strong fluctuations of the fuel level on the inside of the fuel tank.

Still another object of the present invention resides in a fuel tank in which entry of fuel into the vent line due to any splashing about of fuel in any part of the tank is effectively precluded.

A further object of the present invention resides in a fuel tank in which only a single line has to be extended toward the outside so that other connecting places disposed outside the tank are eliminated.

A still further object of the present invention resides in a fuel tank for motor vehicles which is simple in construction and obviates the need for mechanically operating parts such as valves.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic side elevational view of a motor vehicle fuel tank for a passenger motor vehicle with an additional container arranged within the same in accordance with the present invention;

FIG. 2 is a schematic plan view on the motor vehicle fuel tank according to FIG. 1, shown partly in cross section;

FIG. 3 is a schematic partial cross-sectional view, on an enlarged scale, taken along line III—III of FIG. 1;

FIG. 4 is a schematic partial cross-sectional view, on an enlarged scale, through a modified embodiment of a fuel tank and container in accordance with the present invention, within the area of the dome thereof with a container made of synthetic plastic material; and FIG. 5 is a schematic plan view on the container according to FIG. 4; and FIG. 6 is a schematic view of a portion of a motor vehicle with a fuel tank disposed in accordance with the present invention.

Referring now to the drawing wherein like reference numerals are used throughout the various views to designate like parts, reference numeral 1 generally designates in the various figures a fuel tank for vehicles, especially for passenger motor vehicles, in the not-installed condition which is to be arranged transversely in the vehicle and which is provided at one side facing one of the longitudinal sides of the vehicle near the top with a filler pipe connection 2. The filler pipe 2 is adapted to be closed by a tank lid 3 providing an airtight seal. The maximum filling height of the tank 1 is determined by the lower edge of the filler pipe 2, and the maximum filler level is indicated in FIG. 1 by reference numeral 4.

Referring to a plan view, a container generally designated by reference numeral 5 is provided approximately centrally within the tank 1, whose upper wall 6 is disposed adjacent the upper tank wall 7 and which is arranged partially in the tank space disposed above the maximum filling height 4. The container 5 is provided at its bottom side, preferably centrally thereof, with an aperture 8 of small diameter. The diameter of the opening 8 may amount, for example, to about 2 mm. Otherwise, the container 5 is of closed construction and includes exclusively only one connection to the tank which leads by way of a dome 9 arranged on the tank 1 and disposed centrally above the container 5. A connecting channel 10 terminates first of all in the dome 9 which starts from the container 5 and extends through the upper tank wall 7; the opening of the connecting channel 10 on the side of the dome 9 is disposed near the apex 11 of the dome 9. Channels 12 which may be formed by recesses or apertures in an insert 13 disposed between the upper tank wall 7 and the upper wall 6 of the container 5, form in the embodiment according to FIGS. 1 to 3 a further channel 21 between the tank 1 and the container 5. The insert 13 can be held either by clamping action between the corresponding walls of the container 5 and of the tank 1 or may also be connected with the container top wall 6 or with the upper tank wall 7. The channels formed by apertures or recesses in the insert 13 extend appropriately labyrinth-like so that they permit without difficulty the flow therethrough of gases but render difficult the passage of liquid, in particular, of fuel in the instant case.

The connecting channel 10 is constituted in the embodiment of FIGS. 1 to 3 by a pipe 14 inserted into the upper wall 6 of the container 5, which at its lower end disposed within the container 5 above the maximum filling height 4 is expanded into a funnel 15. The end of the pipe 14 disposed in the dome 9 which delimits the channel opening on the side of the dome, is provided with a collar 16 that is disposed in a plane approximately perpendicular to the axis of the connecting channel 10.

A venting and pressure release pipe 17 projects from above into the connecting channel 10, whose diameter is smaller at least within the area of overlap with the pipe 14 than the inner diameter of the pipe 14 so that the overlapping part of the venting and pressure release pipe 17 projecting into the channel and overlapping with the pipe 14 delimits an annular gap together with the corresponding portion of the pipe 14. This annular gap 18 is relatively narrow so that though it enables a far-reaching free passage of gas, fuel can enter therethrough only dropwise. Starting from its area overlapping with pipe 14, the vent and pressure release pipe 17 extends out of the dome 9 in the upward direction.

The container 5 illustrated in this embodiment includes, as mentioned already above, a portion disposed above the maximum filling height 4. This position extends, as viewed in plan view, over a larger area than the portion of the container 5 disposed below the maximum filling height, with respect to which the container portion disposed above the maximum filling height includes container sections 19, 20 offset step-shaped toward the outside over the entire container circumference. Of these, the container sections 19, which extend in the described tank arrangement toward the longitudinal side zones of the vehicle, are constructed wider than the sections 20 which extend transversely to the side zones of the vehicle. As is shown in FIG. 2, the container sections 20 adjoin directly the corresponding side walls of the tank 1.

The dimensional lay-out of the container 5 in relation to the tank 1 is determined in that an equalization volume has to be kept free on the inside of the tank by the container 5 at the bottom side of which is provided exclusively the opening 8 of small cross section, which equalization volume precludes also with maximum tank filling an overflow of fuel caused by temperature-conditioned volume expansions thereof into the vent and pressure release line 17. Such an equalization volume is obtained in that during the filling of the tank with fuel, the level in the tank 1 rises considerably more rapidly than in the container 5 into which the fuel can enter only relatively slowly by reason of the small cross section of the aperture 8. The container sections 19 and 20 overhanging outwardly with respect to the lower container portion, which form additional volumes, serve for the prevention of the penetration of fuel present in the container 5 into the vent and pressure release line when driving through curves, during which the fuel level in the container 5 assumes an inclined position; it is achieved by these container sections 19 and 20 that the fuel level in the container 5 (compare FIG. 1) during curve drives, braking or acceleration operations does not reach the vent and pressure release line 17 notwithstanding the inclined position.

Whereas the preceding considerations started with the concept of a filling level of the container 5 that corresponds to the maximum filling height 4 of the tank 1, theoretically the possibility also exists that the fuel filling height in the container 5 rises above the filling height in the tank 1. This possibility exists in principle by reason of the connection leading by way of the dome 9 between the tank 1 and the container 5, however, in practice it is hardly without any significance for it has been discovered that also during extreme loads on circular tracks, it is possible to traverse a large number of circular tracks before it comes to a fuel rise in the container 5 which could have as a consequence a discharge of fuel by way of the vent and pressure release line. This is conditioned by the fact that also with a position of the fuel level in the tank 1 as is indicated for curve drives in FIG. 1 by the dash line 4', the in-flow of larger fuel quantities into the container 5 is possible only very slowly. This rests on the fact that the fuel has to pass at first through the labyrinth-like channels 12, can then reach thereafter the dome 9 by way of the relatively small annular gap between the pipe 14 and the upper tank wall 7 and then can overflow out of the dome 9 into the container 5 only by way of the annular gap 18 which also has only a very small cross section and thus permits only a dropwise entry of fuel into the container 5. This means, applied to driving conditions which are normally possible on road traffic or city traffic, that a penetration of fuel into the container by way of the connection leading through the dome 9 is in practice precluded. Contributing thereto significantly also is the fact that the opening cross section on the side of the dome of the channel 10 is located relatively high and a penetration of fuel into this opening cross section which is covered off far-reachingly by the pipe 17 projecting into the channel 10, is made still more difficult by the collar 16 which, in particular makes difficult the entry of fuel which has reached the dome and splashes about therein, as long as the fuel level in the dome is below the collar 16. A further safety against the penetration of fuel into the vent and pressure release line 17 resides in that this pipe 17 is extended out at the top by way of the dome 9 whereby additional height is gained which would have to be overcome by the fuel.

A further constructive embodiment for the container will be described by reference to FIGS. 4 and 5. A synthetic plastic container made of any known appropriate synthetic plastic material is used as container in this embodiment which is designated therein by reference numeral 22 and which includes a mushroom-shaped top generally designated by reference numeral 23 and projecting into the dome 9. The top 23 made in one piece with the container 22 is provided with a bore 24 as connecting channel between the dome 9 and the container 22. The head portion 25 of the mushroom-shaped top 23 abuts at the top wall 26 of the dome 9. The connection between the channel constituted by the bore 24 and the interior space of the dome 9 is established by groove-shaped channels 27 provided in the head portion 25. The channels 27 may extend radially and preferably have an inclination or drop toward the outer circumference of the head portion 25 so that any fuel entering the same does not necessarily enter into the bore 24 but has a tendency to flow back into the interior space of the dome 9. The vent and pressure release pipe 17 again projects from above into the connecting channel constituted by the bore 24 so that also with this solution an annular gap 18, exists, through which only the overflow of a slight fuel quantity per time unit into the container 22 is possible also in case the dome 9 is filled with fuel. The channels leading from the dome 9 to the tank 1, not illustrated in detail, are designated by reference numeral 28 and are consituted by bead-shaped indentations or embossments in the top wall 29 of the container 22, which top wall abuts against the upper tank wall 7. This can be achieved in that the container 22, as indicated at 30, is threadably secured with respect to the upper wall 7 of the tank 1. In order to render more difficult the inflow of fuel through the channels 28, the latter, as illustrated in FIG. 5, are not realized rectilinearly up to the lateral ends of the container 22, but are in communication with the tank interior space by way of cross channels 31 which may also be provided in the upper wall 29 of the container 22. The channels 28 and 31 provided as connections between the dome 9 and the tank 1 therefore form also in this embodiment a labyrinth again. The ends of the channel 28 facing the dome 9 are preferably so located that only short end sections thereof are disposed within the circularly shaped aperture 32 in the top wall 7 of the tank which is necessary for the installation into the dome 9 of the top 23 appertaining to the container 22. Also as a result thereof, the overflow of fuel out of the tank 1 into the dome 9 is rendered more difficult.

FIG. 6 illustrates a mounting of the fuel tank 1 of the present invention within a rear portion of a motor vehicle, generally designated by the reference numeral 33, substantially transversely to the vehicle longitudinal direction above the rear wheel axle of the vehicle.

The present invention enables a tank principle, as illustrated by the embodiments, in which only one, possibly rigid line for the venting of the tank has to be extended to the outside so that connecting places located outside of the tank are eliminated. Furthermore, the construction according to the present invention operates without valves and is therefore not prone to failures. In particular, only a very small structural height for the dome is necessary with the construction according to the present invention which is significant since with the arrangement of the tank above the rear axle also only relatively little space is available in height. In the illustrated embodiment, the height of the dome above the tank 1 amounts to about 25 mm.

Within the scope of the present invention, the tank may be constructed subdivided for the installation of the container and, depending on the particular type of construction, the dome may be made in one piece with the upper container parts or mounted thereon.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A fuel tank for vehicles, comprising: a container provided on the inside of the tank in the highest area thereof, said container being disposed at least partially above the maximum filling height of the tank and being substantially closed except for at least one aperture of small cross section located on the bottom side thereof, a dome arranged on the tank, connecting means from said container to the tank being provided in said dome, a portion of said connecting means leading from said dome to said container being formed by a channel having a channel opening on the dome side, and a vent line for the tank extending upwardly out of said dome and projecting into said channel thereby forming an annular gap of relatively small cross section between said vent line and said channel.

2. A fuel tank according to claim 1, wherein said channel opening on the dome side is located near the apex of the dome.

3. A fuel tank according to claim 2, wherein the tank is for passenger motor vehicles and is located above the rear axle thereof.

4. A fuel tank according to claim 1, wherein said channel is constituted by a pipe inserted into said container, said pipe being enlarged funnel-shaped at its end disposed on the inside of said container above the maximum filling height of the tank.

5. A fuel tank according to claim 4, wherein said pipe constituting said channel is provided with a collar at its end disposed on the inside of said dome.

6. A fuel tank according to claim 1, wherein said container is made of synthetic plastic material, and said channel is constituted by a bore provided within a substantially mushroom-shaped container top.

7. A fuel tank according to claim 6, wherein the head portion of the mushroom-shaped container top abuts at the inner surface of said dome and a groove-shaped channel means are provided in the head surface which lead to said bore.

8. A fuel tank according to claim 7, wherein said groove-shaped channel means are inclined toward the outer circumference of the head portion.

9. A fuel tank according to claim 1, wherein said connecting means in the transition from said dome to the tank is constituted by channel means extending between an upper tank wall and a top wall of said container adjacent thereto.

10. A fuel tank according to claim 9, wherein said channel means extending between said dome and the tank communicates with said dome by way of a gap provided between an outer wall of said channel means which terminates in said dome and is connected with said container and said upper tank wall traversed by this channel means.

11. A fuel tank according to claim 10, wherein said channel means extending between said dome and the tank are arranged labyrinth-like.

12. A fuel tank according to claim 11, wherein said channel means extending between said dome and the tank are provided in an intermediate layer arranged between an upper wall of said container means and an upper tank wall.

13. A fuel tank according to claim 11, wherein said channel means extending between said dome and the tank are provided in an upper wall of said container.

14. A fuel tank according to claim 11. wherein said channel means extending between said dome means and the tank are provided in an upper wall of the tank.

15. A fuel tank according to claim 11, wherein said container abuts by way of a top wall at an upper wall of the tank.

16. A fuel tank according to claim 11, wherein at least on two sides of said dome at least one channel means is provided extending toward a tank lateral zone, which terminates in a channel means extending substantially transversely with respect thereto.

17. A fuel tank according to claim 11, wherein said container is provided approximately centrally in the tank as viewed in plan view.

18. A fuel tank according to claim 17, wherein the tank is arranged transversely in relation to the vehicle longitudinal direction.

19. A fuel tank according to claim 18, wherein said container arranged on the inside of the tank is provided within its area above the maximum filling height of the tank with additional volumes constituted by widened portions.

20. A fuel tank according to claim 19, wherein said container in its upper area includes container sections extending toward the lateral zones of the tank as widened portions, said container sections having a height corresponding approximately to the tank height above the maximum filling height and a bottom side located substantially at the height of the maximum filling height.

21. A fuel tank according to claim 19, wherein said container is provided within its upper area with a container section offset step-shaped toward the outside over its entire circumference, said container section having a height corresponding approximately to the tank height above the maximum tank-filling height and a bottom side disposed approximately at the height of the maximum tank-filling height.

22. A fuel tank according to claim 19, wherein said channel opening on the dome side is located near the apex of the dome means.

23. A fuel tank according to claim 19, wherein said channel is constituted by a pipe inserted into said container, said pipe being enlarged funnel-shaped at its end disposed on the inside of said container above the maximum filling height of the tank.

24. A fuel tank according to claim 23, wherein said pipe constituting said channel is provided with a collar at its end disposed on the inside of said dome.

25. A fuel tank according to claim 19, wherein said container is made of synthetic plastic material and said channel is constituted by a bore provided within a substantially mushroom-shaped container top.

26. A fuel tank according to claim 25, wherein the head portion of the mushroom-shaped container top abuts at the inner surface of said dome and a groove-shaped channel means are provided in the head surface which lead to said bore.

27. A fuel tank according to claim 26, wherein said groove-shaped channel means are inclined toward the outer circumference of the head portion.

28. A fuel tank according to claim 9, wherein said channel means extending between said dome and the tank are arranged labyrinth-like.

29. A fuel tank according to claim 1, wherein said container abuts by way of a top wall at an upper wall of the tank.

30. A fuel tank according to claim 1, wherein at least on two sides of said dome at least one channel means is provided extending toward a tank lateral zone, which terminates in a channel means extending substantially transversely with respect thereto.

31. A fuel tank according to claim 1, wherein said container is provided approximately centrally in the tank as viewed in plan view.

32. A fuel tank according to claim 1, wherein the tank is arranged transversely in relation to the vehicle longitudinal direction.

33. A fuel tank according to claim 1, wherein said container arranged on the inside of the tank is provided within its area above the maximum filling height of the tank with additional volumes consituted by widened portions.

34. A fuel tank according to claim 33, wherein said container in its upper area includes container sections extending toward the lateral zones of the tank as widened portions, said container sections having a height corresponding approximately to the tank height above the maximum filling height and a bottom side located substantially at the height of the maximum filling height.

35. A fuel tank according to claim 33, wherein said container is provided within its upper area with a container section offset step-shaped toward the outside over its entire circumference, said container section having a height corresponding approximately to the tank height above the maximum tank-filling height and a bottom side disposed approximately at the height of the maximum tank-filling height.

* * * * *